(12) United States Patent
Takeda et al.

(10) Patent No.: US 6,586,125 B2
(45) Date of Patent: Jul. 1, 2003

(54) COMBUSTION HEATING DEVICE, FUEL REFORMING APPARATUS INCLUDING COMBUSTION HEATING DEVICE, AND FUEL CELL SYSTEM

(75) Inventors: Yukihiko Takeda, Susono (JP); Koichi Kuwaba, Nagoya (JP); Shigeru Ogino, Toyota (JP); Akira Yamanaka, Gifu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 135 days.

(21) Appl. No.: 09/828,893

(22) Filed: Apr. 10, 2001

(65) Prior Publication Data
US 2001/0031387 A1 Oct. 18, 2001

(30) Foreign Application Priority Data
Apr. 12, 2000 (JP) .................................. 2000-110633

(51) Int. Cl.[7] .......................... H01M 8/00; H01M 8/04; H01M 8/18; H01M 8/12
(52) U.S. Cl. ............................. 429/17; 429/13; 429/20; 429/24
(58) Field of Search .............................. 429/12, 13, 17, 429/20, 24, 25, 26

(56) References Cited

U.S. PATENT DOCUMENTS

| | | | | |
|---|---|---|---|---|
| 4,588,659 A | * | 5/1986 | Abens et al. ................. | 429/20 |
| 5,379,728 A | * | 1/1995 | Cooke .......................... | 123/3 |
| 5,515,814 A | * | 5/1996 | Cooke .......................... | 123/3 |
| 6,230,494 B1 | * | 5/2001 | Botti et al. ................... | 60/649 |
| 6,440,596 B1 | * | 8/2002 | Ruhl et al. .................... | 429/34 |
| 6,451,465 B1 | * | 9/2002 | Chalfant et al. .............. | 429/20 |

FOREIGN PATENT DOCUMENTS

| | | |
|---|---|---|
| JP | A 04-164802 | 6/1992 |
| JP | A 08-119602 | 5/1996 |

* cited by examiner

Primary Examiner—Randy Gulakowski
Assistant Examiner—Donald V. Scaltrito
(74) Attorney, Agent, or Firm—Oliff & Berridge, PLC

(57) ABSTRACT

A combustion heating device for heating a fluid to be heated includes a fuel supply device that supplies the fuel to the device, and a vaporizing device that burns a portion of the fuel supplied by the fuel supply device, and vaporizes a remaining portion of the fuel by using heat generated through combustion of the portion of the fuel. The combustion heating device further includes a first air supply device that supplies air to be used for combustion of the portion of the fuel by the vaporizing device, and a second air supply device that supplies air to be used for combustion of the remaining portion of the fuel vaporized by the vaporizing device. A fuel reforming apparatus incorporating the combustion heating device as vaporizing section, and a fuel cell system including the fuel reforming apparatus are also provided.

19 Claims, 5 Drawing Sheets

COMBUSTION HEATING DEVICE, FUEL REFORMING APPARATUS INCLUDING COMBUSTION HEATING DEVICE, AND FUEL CELL SYSTEM

INCORPORATION BY REFERENCE

The disclosure of Japanese Patent Application No. 2000-110633 filed on Apr. 12, 2000, including the specification, drawings and abstract, is incorporated herein by reference in its entirety.

BACKGROUND OF THE INVENTION

1. Field of the Invention

The invention relates to a combustion heating device, a fuel reforming apparatus including the combustion heating device, and a fuel cell system. More particularly, the invention relates to a combustion heating device adapted to heat a fluid to be heated, by using heat produced by combustion of fuel, a fuel reforming apparatus that includes the combustion heating device and operates to reform hydrocarbon-based fuel into hydrogen-rich fuel gas, and a fuel cell system having the fuel reforming apparatus and a fuel cell that generates electric power when supplied with air and a fuel gas from the fuel reforming apparatus.

2. Description of Related Art

An example of the combustion heating device of the above type is disclosed in, for example, Japanese laid-open Patent Publication No. 8-119602. In this combustion heating device, a mixture of air and methanol supplied as a fuel is heated by means of a heater, and is supplied to a heat exchanger in which a fluid to be heated is heated by using heat generated through catalytic combustion of the fuel. The fluid to be heated may be a reformable material composed of, for example, methanol and water. The combustion heating device is incorporated as a vaporizing section for heating and vaporizing the reformable material as a fluid to be heated, in a methanol reforming apparatus that reforms methanol into a hydrogen-rich fuel gas through steam reforming.

In the above-described combustion heating device, however, methanol as a liquid fuel and air are supplied on the upstream side of a heater. It is therefore often difficult to uniformly mix the liquid fuel and air with each other to provide a homogeneous mixture. If the mixture of fuel and air is not uniformly mixed together, variations arise in the intensity or degree of combustion, in particular, catalyst combustion, resulting in a reduced efficiency with which the fuel is burned, and an accordingly reduced operating efficiency of the combustion heating apparatus.

SUMMARY OF THE INVENTION

It is an object of the invention to provide a combustion heating device capable of uniformly mixing air with fuel. It is another object of the invention to provide a combustion heating device that is able to burn fuel in an appropriate manner to yield an improved efficiency. It is still another object of the invention to provide a fuel reforming apparatus capable of efficiently vaporizing at least a portion of a reformable material. It is yet another object of the invention to provide a fuel cell system which provides an improved energy efficiency and/or which is simplified in construction and reduced in size.

To accomplish at least one of the above and other objects, there is provided according to a first aspect of the invention a combustion heating device adapted to beat a fluid to be heated, by using heat generated through combustion of a fuel, comprising: (1) a fuel supply device that supplies the fuel to the device, (2) a vaporizes a remaining portion of the fuel by using heat generated through combustion of the portion of the fuel, (3) a first air supply device that supplies air to be used for combustion of the portion of the fuel by the vaporizing device, and (4) a second air supply device that supplies air to be used for combustion of the remaining portion of the fuel vaporized by the vaporizing device.

In the combustion heating device according to the first aspect of the invention as described above, the first air supply device supplies air to be used for burning a portion of fuel supplied by the fuel supply device, to a vaporizing device in which the remaining fuel is vaporized by using heat generated through combustion of the portion of the fuel, and the second air supply device supplies air to be used for burning the fuel vaporized by the vaporizing device. Namely, the air used for combustion of the fuel during vaporization of the fuel and the air used for combustion of the vaporized fuel are supplied separately or independently of each other. Since the air supplied by the second air supply device is fed into the vaporized fuel, the air and the vaporized fuel can be more uniformly mixed together as compared with a mixture of air and a liquid fuel. Consequently, variations in the intensity or degree of combustion of the fuel can be reduced, and the fuel can be burned with an improved efficiency.

In the combustion heating device as described above, the fuel supply device may spray the fuel into the device. In this case, the vaporizing device can easily vaporize the fuel with improved efficiency.

Also, the combustion heating device of the invention may further include a first air amount control unit that controls an amount of air supplied by the first air supply device, based on an amount of the fuel supplied by the fuel supply device. This makes it possible to supply a more appropriate amount of air for vaporizing the fuel. In this case, the first air amount control unit may control the first air supply device so as to supply an amount of air that is needed for vaporizing the fuel supplied to the device. Thus, the amount of the supplied air can be suitably adjusted not to be greater or less than the amount required for vaporization of the fuel.

Furthermore, the combustion heating device of the invention may further include a second air amount control unit that controls an amount of air supplied by the second air supply device, based on an amount of the fuel supplied by the fuel supply device. This makes it possible to supply a more appropriate amount of air for burning vaporized fuel.

The combustion heating device may further include a heat exchanger that carries a catalyst capable of burning the fuel, and is operable to heat the fluid to be heated, by using heat that is generated when a fuel contained in a mixed gas of the fuel vaporized by the vaporizing device and the air supplied by the second air supply device is burned on the catalyst.

According to a second aspect of the invention, there is provided a fuel reforming apparatus for reforming a hydrocarbon-based fuel into a hydrogen-rich fuel gas, comprising: (a) the combustion heating device according to the first aspect of the invention, and (b) a reforming device that is supplied with the at least one of the hydrocarbon-based fuel and water that has been vaporized by the combustion heating device, and reforms the hydrocarbon-based fuel into the fuel gas through a steam reforming reaction.

In the fuel reforming apparatus as described above, the combustion heating device of the first aspect of the invention is used as a vaporizing section for heating and vaporizing a hydrocarbon-based fuel and/or water as a fluid to be heated, to thus yield substantially the same effects as provided by the combustion heating device. Namely, the fuel can be burned with improved efficiency, so as to highly efficiently heat and vaporize the hydrocarbon-based fuel and/or water as a fluid to be heated.

According to a third aspect of the invention, there is provided a fuel cell system comprising a fuel reforming apparatus adapted to reform a hydrocarbon-based fuel into a hydrogen-rich fuel gas; and a fuel cell that is supplied with the hydrogen-rich fuel gas from the fuel reforming apparatus and the air, so as to generate electric power, wherein the fuel reforming apparatus is constructed according to the second aspect of the invention, and at least one of the first air supply device and the second air supply device supplies air to the fuel cell.

The fuel cell system of the invention, which includes the fuel reforming apparatus according to the second aspect of the invention, yields substantially the same effects as provided by the fuel reforming apparatus as described above. Namely, the fuel can be burned with improved efficiency, so as to highly efficiently heat and vaporize the hydrocarbon-based fuel and/or water as a fluid to be heated. In addition, since the first air supply device and/or the second air supply device is/are used for supplying air to the fuel air, the whole system can be simplified in construction and reduced in size.

The fuel cell system may further include a first cathode exhaust gas supply device that supplies cathode exhaust gas of the fuel cell in addition to or in place of the air supplied by the first air supply device. With this arrangement, exhaust gas emitted from the system can be advantageously reduced.

Also, the fuel cell system may further include a second cathode exhaust gas supply device that supplies a cathode exhaust gas of the fuel cell in addition to or in place of the air supplied by the second air supply device. With this arrangement, too, exhaust gas emitted from the system can be advantageously reduced.

Furthermore, the fuel cell system may further include an anode exhaust gas supply device that supplies an anode exhaust gas of the fuel cell in addition to the air supplied by the second air supply device. With this arrangement, hydrogen contained in the anode exhaust gas of the fuel cell can be effectively utilized for burning the fuel vaporized by the vaporizing device. Consequently, the energy efficiency of the whole system can be improved.

BRIEF DESCRIPTION OF THE DRAWINGS

The foregoing and/or further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
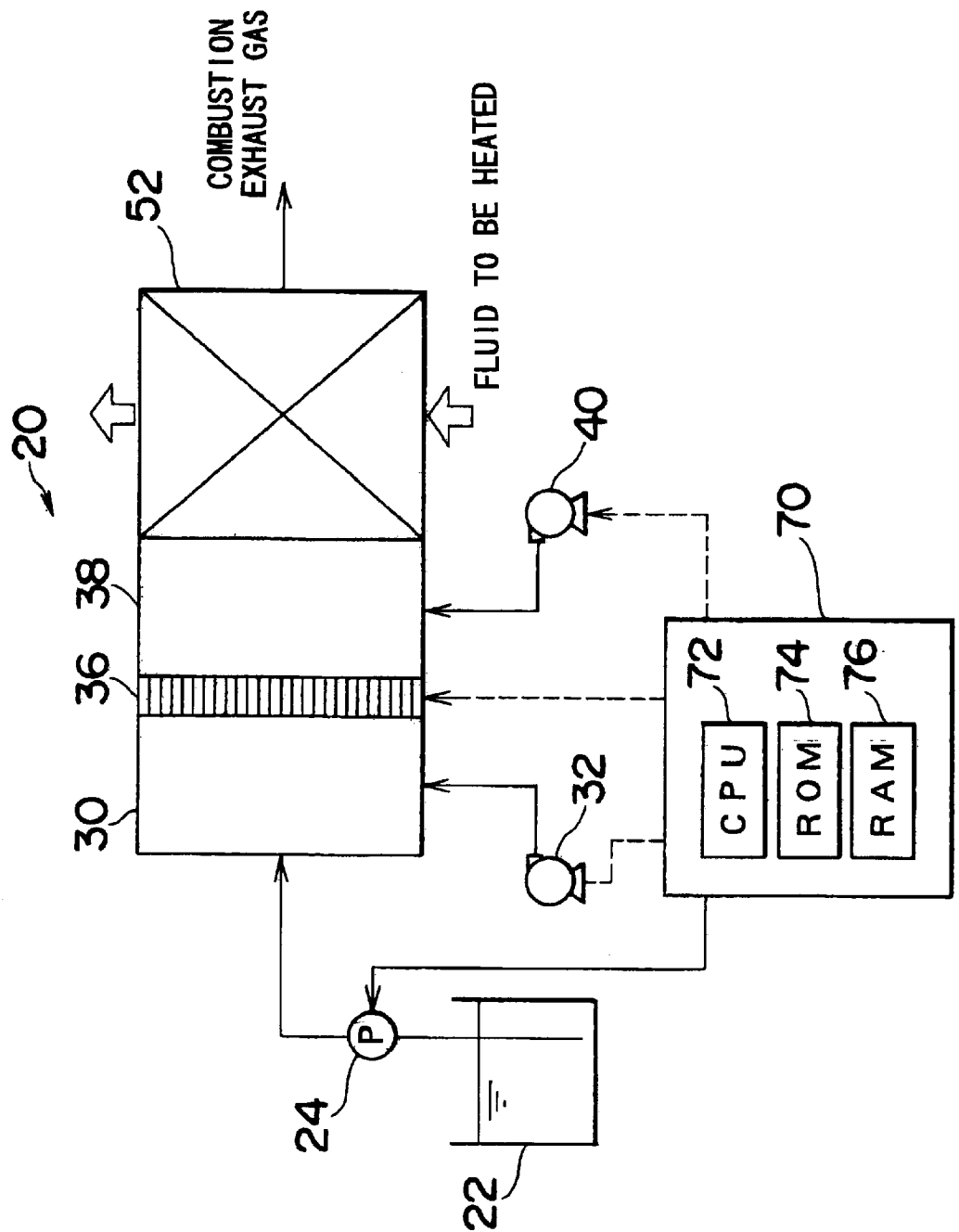
FIG. 1 is a diagram schematically illustrating the construction of a combustion heating device according to one embodiment of the invention.
Figure 2:
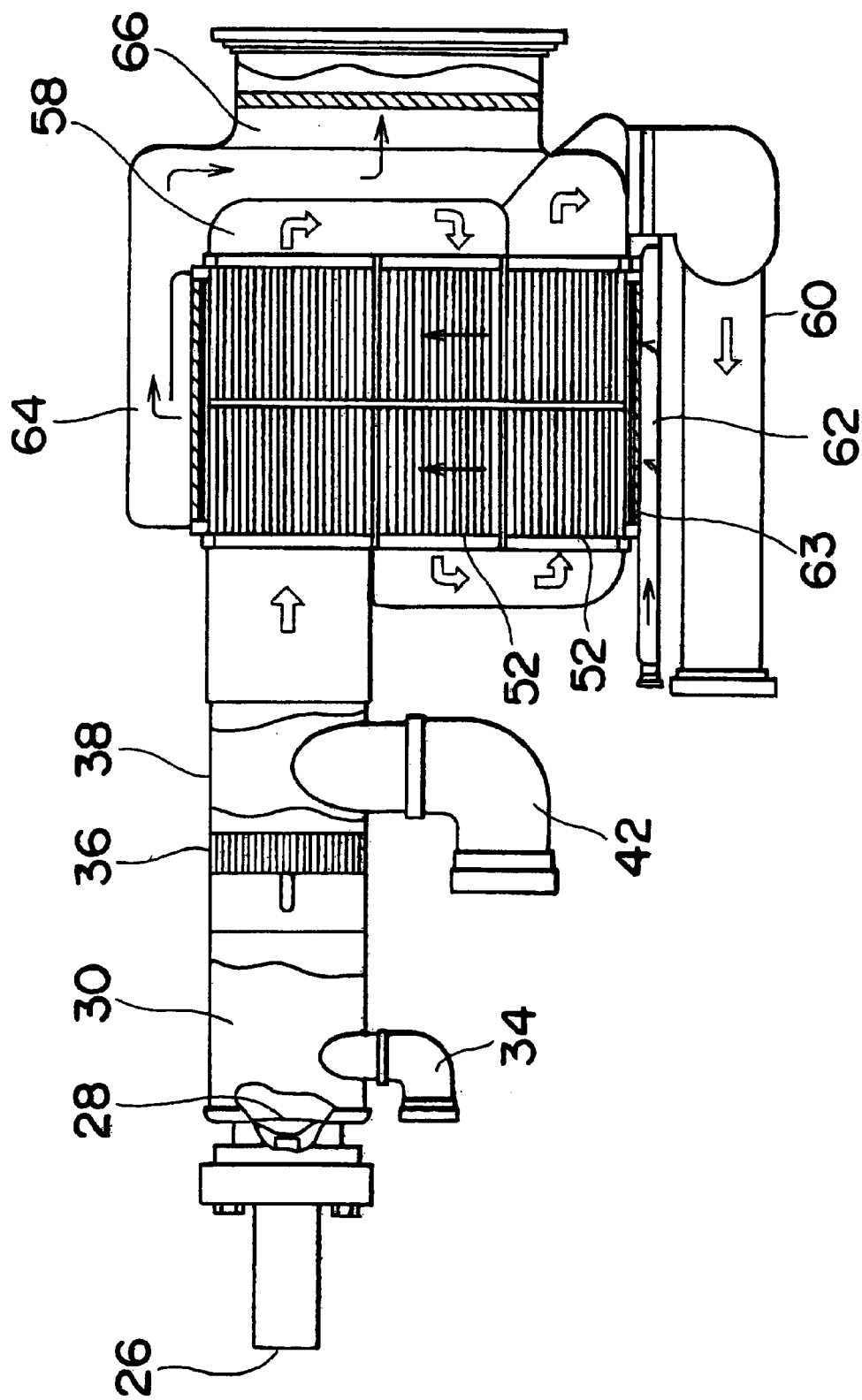
FIG. 2 is a diagram schematically illustrating the construction of a main body of the combustion heating device of the embodiment as shown in FIG. 1.

Preferred embodiments of the invention will be described hereinafter with reference to the accompanying drawings. FIG. 1 schematically illustrates the construction of a combustion heating device 20 according to one embodiment of the invention. FIG. 2 schematically illustrates the construction of a main part of the combustion heating device 20.

As shown in FIG. 1, the combustion heating device 20 of the embodiment includes a first mixing chamber 30, a combustion heater 36, a second mixing chamber 38, a heat exchanger 52, and an electronic control unit 70 for controlling the whole apparatus. A fuel supplied from a fuel tank 22 by a fuel pump 24 is mixed with air supplied from a first blower 32 in the first mixing chamber 30. The combustion heater 36 burns a portion of the fuel from the first mixing chamber 30, and vaporizes the remaining fuel by using heat resulting from the combustion of the fuel. The thus vaporized fuel is then mixed with air supplied from a second blower 40 in the second mixing chamber 38, and is fed to the heat exchanger 52 in which the vaporized fuel is burned and a liquid to be heated is heated by using heat generated through the combustion of the fuel.

As shown in FIG. 2, an injector 28 and a first air conduit 34 are attached to the first mixing chamber 30. The injector 28 serves to spray fuel supplied from a fuel supply port 26, and the first air conduit 34 serves to introduce air from the first blower 32 into the first mixing chamber 30 in a direction that is offset from a direction perpendicular to the axis of flow of the fuel sprayed in the first mixing chamber 30. The first mixing chamber 30 is designed so that the fuel sprayed by the injector 28 and air introduced from the first air conduit 34 are substantially uniformly mixed with each other.

The combustion heater 36 is formed as an EHC (Electrically Heated Catalyst) that carries on its surface a catalyst that enables combustion of the fuel. The combustion heater 36 burns a portion of the sprayed fuel by using oxygen present in air introduced into the first mixing chamber 30, and vaporizes the remaining fuel by using heat produced by the combustion.

A second air conduit 42 is attached to the second mixing chamber 38 in a direction that is offset from a direction perpendicular to the axis of flow of the fuel in the second mixing chamber 38. The fuel vaporized by the combustion heater 36 is substantially uniformly mixed with air supplied from the second blower 40 via the second air conduit 42. The resulting mixture is supplied into the heat exchanger 52 mounted in a combustion gas passage 58 that is formed in a serpentine fashion, and is then discharged via a combustion exhaust gas pipe 60.

Figure 3:
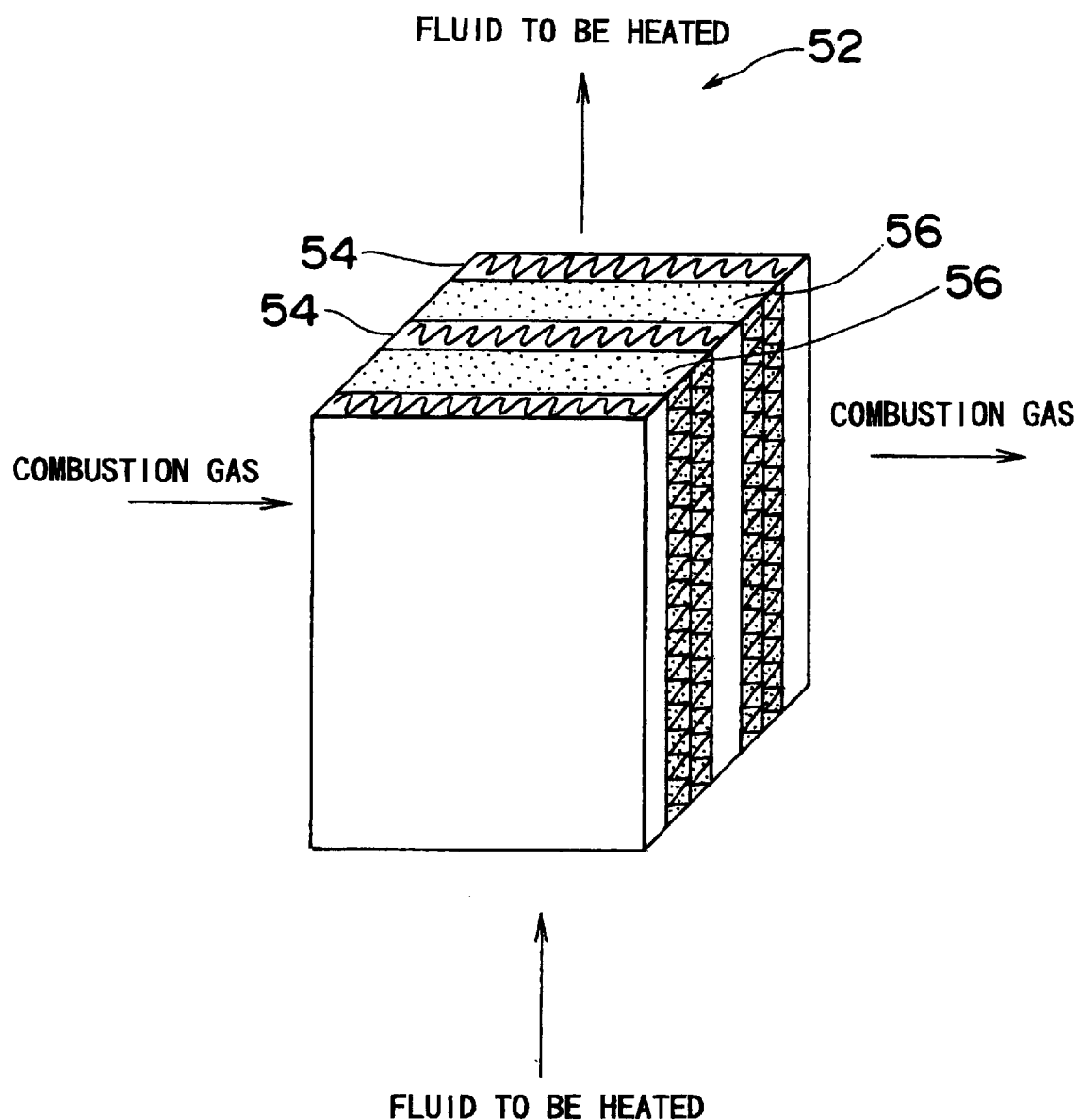
FIG. 3 is a diagram showing an example of a heat exchanger employed in the embodiment of FIG. 1.

An example of the heat exchanger 52 is illustrated in FIG. 3. As shown in FIG. 3, the heat exchanger 52 is formed by alternately stacking fluid passage members 54 each having a corrugated plate having openings facing upward and downward as viewed in FIG. 3, and fuel passage members 56 each having a corrugated plate having openings facing rightward and leftward in FIG. 3. The corrugated plate of each fuel passage member 56 is loaded with a combustion catalyst, such as a platinum catalyst, for burning the fuel, so that the fuel burns on the combustion catalyst while flowing through the fuel passage member 56. Since the fluid passage members 54 and the fuel passage members 56 are alternately stacked or laminated, the fluid to be heated, which is supplied to the fluid passage members 54 from the downside to the upside in the vertical direction, exchanges heat with the combustion gas flowing through the fuel passage members 56 from the left side toward the right side as viewed in FIG. 3, so that the fluid in the members 54 is heated by the combustion gas.

As shown in FIG. 2, the fluid to be heated is supplied from a fluid supply pipe 62 into the fluid passage members 54 of the heat exchanger 52 via an inlet member 63 that is formed from a porous member, and is discharged from an outlet 66 after passing through a discharge pipe 64.

The electronic control unit 70 as shown in FIG. 1 takes the form of a microprocessor including a CPU 72 as a main component, a ROM 74 that stores processing programs, a RAM 76 that temporarily stores data, and input-output ports (not shown). The electronic control unit 70 receives a control signal indicating a required amount of load, and other signals, via an input port (not shown). The electronic control unit 70 outputs drive signals to the fuel pump 24, the first blower 32 and the second blower 40, and a drive signal to the combustion heater 36, and the like, via an output port.

Figure 4:
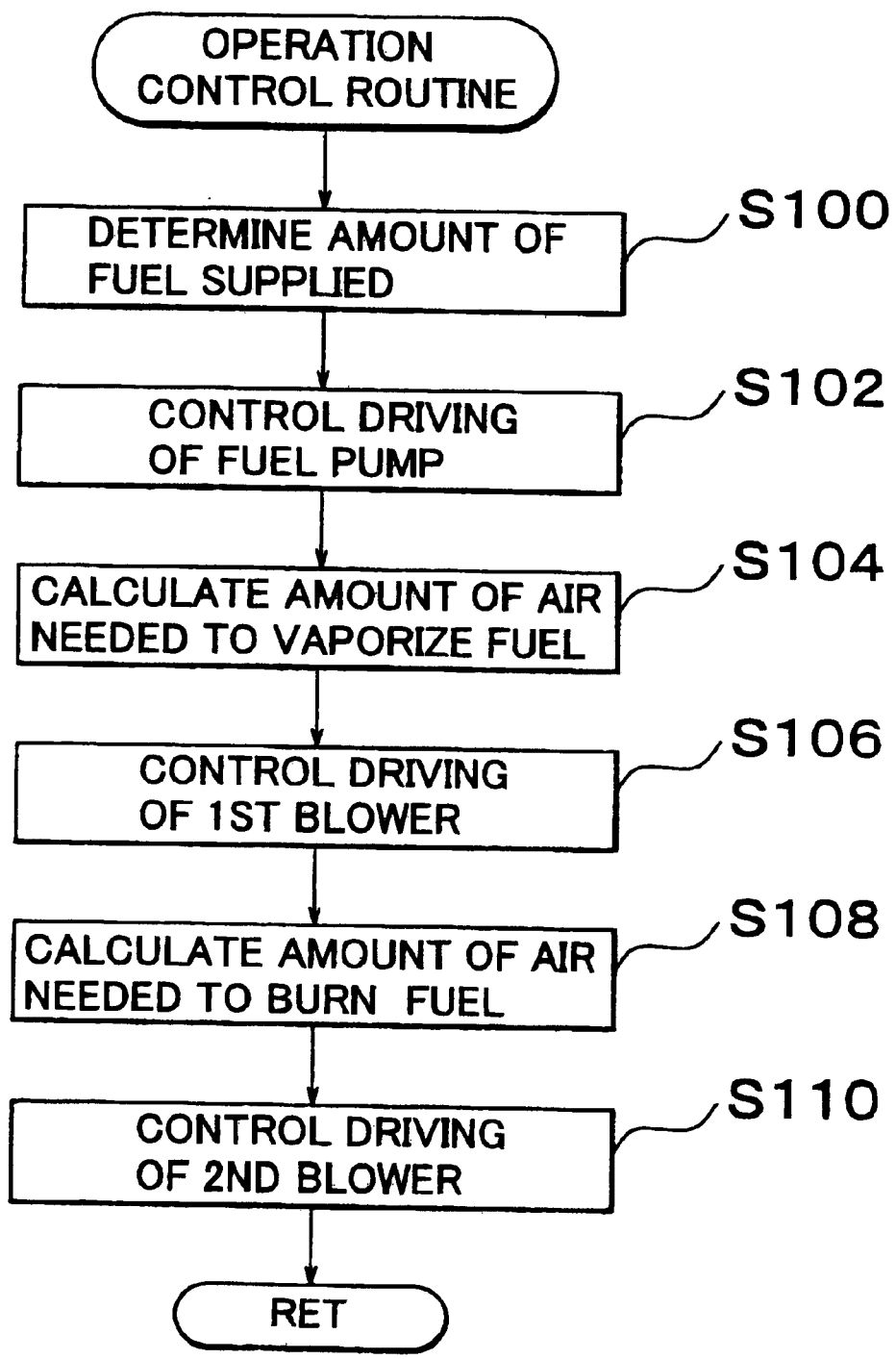
FIG. 4 is a flowchart illustrating an operation control routine executed by an electronic control unit of the combustion heating device of the embodiment of FIG. 1.

Next, the operation of the combustion heating device 20 constructed as described above, in particular, the manner of controlling the operation of the apparatus 20, will be now explained. FIG. 4 is a flowchart illustrating one example of an operation control routine executed by the electronic control unit 70 of the combustion heating device 20 of this embodiment. This routine is repeatedly or cyclically executed at predetermined intervals (e.g., every 100 msec) after the combustion heating device 20 is started.

Upon the start of the operation control routine, the CPU 72 of the electronic control unit 70 first executes step S100 to determine an amount of fuel to be supplied based on a required amount of load. The required amount of load includes, for example, an amount of supply of fluid to be heated and the amount or degree of heating of the fluid. The amount of the fuel to be supplied is determined as an amount of energy needed or required for heating the fluid thus supplied. Subsequently, step S102 is executed to control driving of the fuel pump 24 so that the amount of the fuel thus determined is sprayed from the injector 28 into the first mixing chamber 30.

Next, step S104 is executed to calculate an amount of air needed for the combustion heater 36 to vaporize the fuel, and step S106 is executed to control driving of the first blower 32 so that the calculated amount of air is supplied from the blower 32 to the first mixing chamber 30. The amount of air can be calculated from the temperature and specific heat of the fuel. In this embodiment, the amounts of air to be supplied from the first blower 32 with respect to respective amounts of fuel to be supplied are stored in the form of a map in the ROM 74, and when an actual amount of the fuel supplied is given, the corresponding amount of air to be supplied is extracted or acquired from the map.

Step S106 is followed by step S108 to calculate an amount of air needed to burn the fuel vaporized by the combustion heater 36 in the fuel passage members 56 of the heat exchanger 52, and step S110 is then executed to control driving of the second blower 40 so that the calculated amount of air is introduced into the second mixing chamber 38. The current cycle of the routine is then finished. The needed amount of air may be calculated based on the stoichiometric air-fuel ratio, for example. In this embodiment, the amounts of air to be supplied from the second blower 40 with respect to the respective amounts of fuel supplied are stored in the form of a map in the ROM 74, and when an actual amount of the fuel supplied is given, the corresponding amount of air to be supplied is extracted from the map.

According to the combustion heating device 20 constructed as described above, the amount of air needed to burn a portion of the supplied fuel to vaporize the remaining fuel and the amount of air needed to burn the vaporized fuel in the fuel passage members 56 of the heat exchanger 52 are separately introduced into the heating device 20. This can avoid excessive combustion of the fuel in the combustion heater 36, and the heat exchanging efficiency of the heat exchanger 52 can be improved. Furthermore, since the amount of the fuel to be supplied is determined based on a required amount of load, and the respective amounts of air to be supplied from the first blower 32 and the second blower 40 are calculated based on the amount of the fuel thus determined, an appropriate amount of air can be introduced into an appropriate location even with variations or changes in the required amount of load.

In the combustion heating device 20 of the embodiment, the openings of the first air conduit 34 and the second air conduit 42 that are exposed to the first and second mixing chambers 30, 38, respectively, are formed in a circular shape, but may have a depressed or flat elliptical shape, for example, so that the fuel and introduced air can be more uniformly mixed with each other. While the combustion heating device 20 employs an EHC as the combustion heater 36 in this embodiment, a heater simply used for heating may be used as the combustion heater 36.

In the combustion heating device 20 of the embodiment, a mixture of vaporized fuel and air is supplied to the heat exchanger 52 that consists of the fuel passage members 56 loaded with a catalyst for burning the fuel and the fluid passage members 54 that allow fluid therein to exchange heat with the fuel in the fuel passage members 56. However, another type of heat exchanger may be used which principally consists of a combustion portion that burns a mixture of vaporized fuel and air, a passage for guiding combustion gas from the combustion portion, and fluid passage members that allow fluid therein to exchange heat with the combustion gas in the passage. Furthermore, heat produced through combustion of mixture gas of vaporized fuel and air may be directly applied to the fluid to be heated.

Figure 5:
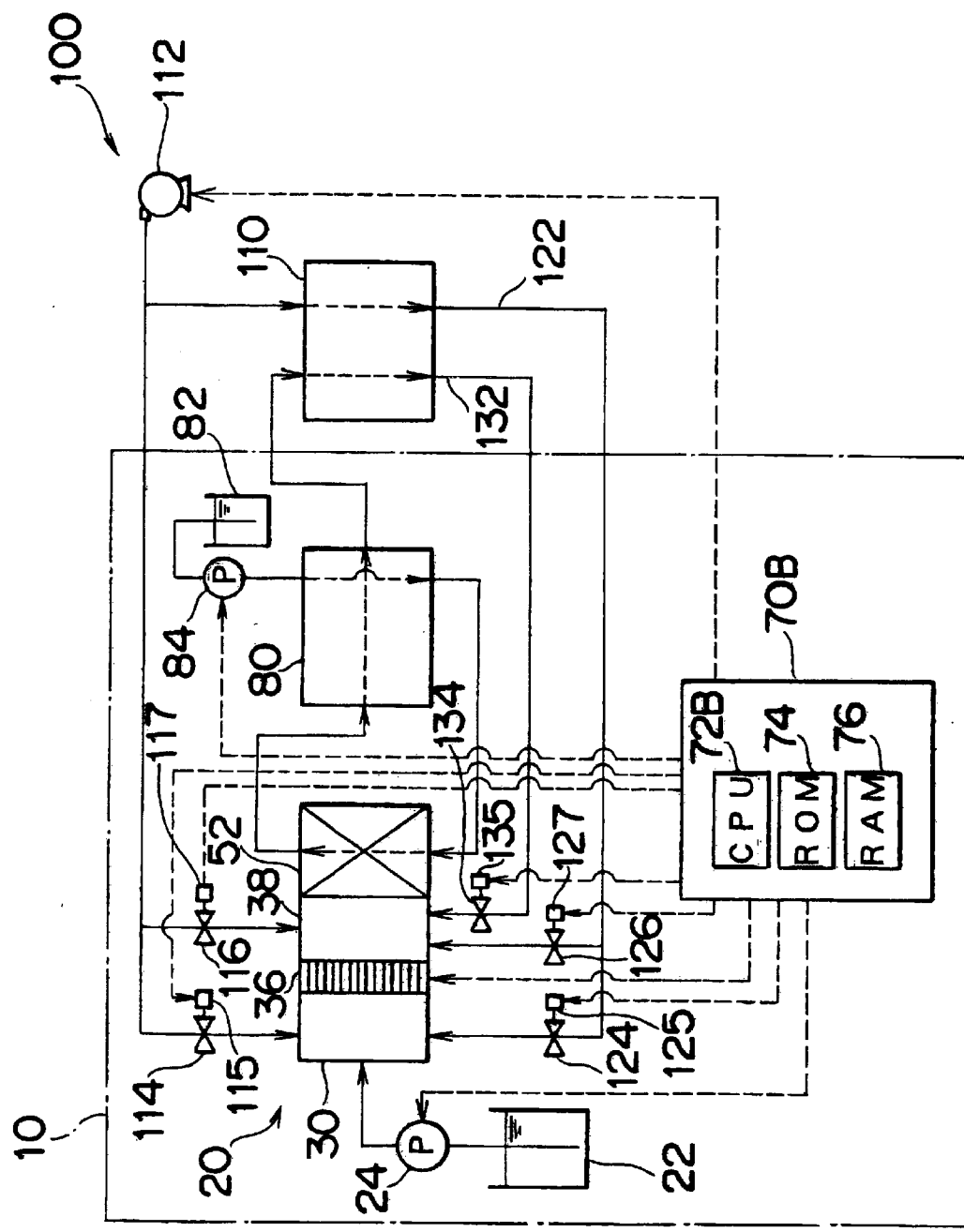
FIG. 5 is a diagram schematically illustrating the construction of a fuel cell system according to one embodiment of the invention.

Next, a fuel cell system 100 including a fuel reforming apparatus 10 and a fuel cell 110 will be now described. The fuel reforming apparatus 10 uses the combustion heating device 20 as a vaporizing section for heating and vaporizing a reformable material composed of a hydrocarbon fuel and water. The fuel cell 110 is adapted to generate electric power when it is supplied with a fuel gas from the fuel reforming apparatus 10. FIG. 5 schematically illustrates the construction of the fuel cell system 100 according to one embodiment of the invention. In the fuel cell system 100 of the embodiment as shown in FIG. 5, the combustion heating device 20 of the foregoing embodiment is incorporated, as a vaporizing section for vaporizing a reformable material composed of water and methanol as a hydrocarbon-based fuel, in the fuel reforming apparatus 10.

The fuel reforming apparatus 10 includes a reformer section 80 that is loaded with a reforming catalyst for effecting stream reforming of methanol as a hydrocarbon-based fuel. A hydrogen-rich fuel gas obtained through reforming in the reformer section 80 is supplied to anodes of the fuel cell 110.

The fuel cell 110 is formed as, for example, a polymer electrolyte fuel cell. The above-indicated fuel gas is supplied from the fuel reforming apparatus 10 to each anode of the fuel cell 110, and air, or an oxygen-containing gas, is supplied from a blower 112 to each cathode of the fuel cell 110. Thus, the fuel cell 110 generates power by using oxygen in air and hydrogen in the fuel gas supplied thereto.

In the combustion heating device 20 of this embodiment, air is introduced into the first mixing chamber 30 and the second mixing chamber 38 from the blower 112 provided for supplying air into the fuel cell 110 as well, rather than from the first blower 32 and the second blower 40 as shown in FIG. 1. The amounts of air supplied to the first mixing chamber 30 and the second mixing chamber 38 can be respectively adjusted by flow regulator valves 114, 116 that are provided in supply pipes connected to the first mixing chamber 30 and the second mixing chamber 38. Since the blower 112 can supply air to both the first mixing chamber 30 and the second mixing chamber 38, the system can be simplified. Exhaust gas from each cathode side of the fuel cell 110 can be supplied into the first mixing chamber 30 and the second mixing chamber 38 through a cathode exhaust gas pipe 122. The amounts of the cathode exhaust gas supplied to the first mixing chamber 30 and the second mixing chamber 38 can be respectively regulated by flow regulator valves 124, 126 that are provided in supply pipes connected to the first mixing chamber 30 and the second mixing chamber 38. By supplying the cathode exhaust gas into the first mixing chamber 30 and the second mixing chamber 38 in this manner, the amount of exhaust gas discharged from the system can be reduced. Furthermore, exhaust gas from each anode side of the fuel cell 110 can be supplied to the second mixing chamber 38 through an anode exhaust gas pipe 132. The amount of the anode exhaust gas supplied to the second mixing chamber 38 can be regulated by a flow regulator valve 134 that is provided in the anode exhaust gas pipe 132. By supplying exhaust gas from the anode side into the second mixing chamber 38 in this manner, hydrogen contained in the exhaust gas can be used as a fuel for heat exchange in the heat exchanger 52.

The reformable material, or the fluid to be heated, which is supplied into the combustion heating device 20 of this embodiment, is delivered under pressure from a reformable material tank 82 into a reformer section 80 by a reformable material pump 84. The temperature of the reformable material is raised by heat generated in the reformer section 80, for example, heat produced by reducing the amount of carbon monoxide present in hydrogen-rich gas obtained by the reforming process, and the thus heated reformable material is supplied to the fluid supply pipe 62 (FIG. 2). The reformable material thus heated is then supplied to the heat exchanger 52 in which the reformable material is vaporized, and then fed to the reformer section 80. An electronic control unit 70B, which is similar to the electronic control unit 70, includes a CPU 72B, a ROM 74B, a RAM 76B, and input-output ports (not shown). The electronic control unit 70B outputs drive signals to actuators 115, 117, 125, 127, 135 of the flow regulator valves 114, 116, 124, 126, 134, a drive signal to the reformable material pump 84, a drive signal to the blower 112, etc., via an output port.

In the combustion heating device 20 of the fuel cell system 100 of the embodiment constructed as described above, the electronic control unit 70B, like the electronic control unit 70, controls the amount of fuel supplied to the first mixing chamber 30, and also controls the amounts of air supplied to the first mixing chamber 30 and the second mixing chamber 38. The amount of fuel supplied is controlled in the manner as described above with respect to the first embodiment, while the amounts of air supplied to the respective chambers 30, 38 are controlled by performing control of the degrees of opening of the corresponding flow regulator valves 114, 116, instead of control of driving of the first blower 32 and the second blower 40 as in the first embodiment. The electronic control unit 70B also controls the amounts of the cathode exhaust gas to the first mixing chamber 30 and the second mixing chamber 38 via the cathode exhaust gas pipe 122, and controls the amount of the anode exhaust gas to the second mixing chamber 38 via the anode exhaust gas pipe 132. These controls are accomplished by controlling the openings of the flow regulator valves 124, 126, 134. In the fuel cell system 100 of the embodiment, when the cathode exhaust gas or the anode exhaust gas is supplied into the first mixing chamber 30 or the second mixing chamber 38, the amount of fuel supplied into the heating device 20 and the amount of air supplied into the first mixing chamber 30 or the second mixing chamber 38 are corrected based on the amounts of the cathode or anode exhaust gas supplied.

In the fuel cell system 100 of the embodiment as described above, the combustion heating device 20 according to one embodiment of the invention can be used as a vaporizing section of the fuel reforming apparatus 10. Furthermore, since the blower 112 can accomplish supply of air into the first mixing chamber 30 and the second mixing chamber 38 in the combustion heating device 20, the entire system can be simplified and reduced in size. Furthermore, the fuel cell system 100 of the embodiment is designed such that the cathode exhaust gas of the fuel cell 110 is supplied to the first mixing chamber 30 and the second mixing chamber 38, whereby the exhaust gas from the entire system can be reduced. Still further, the fuel cell system 100 of the embodiment is designed such that the anode exhaust gas of the fuel cell 110 is supplied to the second mixing chamber 38, so that hydrogen present in the exhaust gas can be used as a fuel for heating the reformable material. Consequently, the energy efficiency of the entire system can be improved.

In the fuel cell system 100 of the illustrated embodiment, the blower 112 serves to supply air to the first mixing chamber 30 and the second mixing chamber 38 of the combustion heating device 20. It is, however, possible to cause the blower 112 to supply air to only one of the first mixing chamber 30 and the second mixing chamber 38, or cause the blower 112 to supply air to neither the first mixing chamber 30 nor the second mixing chamber 38.

While the cathode exhaust gas emitted from the fuel cell 110 is supplied to the first mixing chamber 30 and the second mixing chamber 38 in the fuel cell system 100 of the illustrated embodiment, the cathode exhaust gas of the fuel cell 110 may be supplied to only one of the first mixing chamber 30 and the second mixing chamber 38, or may not be supplied to the first mixing chamber 30 nor to the second mixing chamber 38.

While the anode exhaust gas emitted from the fuel cell 110 is supplied into the second mixing chamber 38 in the fuel cell system 100 of the illustrated embodiment, the anode exhaust gas may not be supplied to the second mixing chamber 38.

While the fuel cell system 100 of the illustrated embodiment uses methanol as a hydrocarbon-based fuel, it is also possible to use other types of hydrocarbon-based fuels, for example, saturated hydrocarbons, such as methane and ethane, unsaturated hydrocarbons, such as ethylene and propylene, alcohols, such as ethanol and propanol.

While the invention has been described with reference to what are presently considered to be preferred embodiments thereof, it is to be understood that the invention is not limited to the disclosed embodiments or constructions. To the contrary, the invention can be embodied in various forms without departing from the scope and spirit of the invention.

What is claimed is:

1. A combustion heating device adapted to heat a fluid to be heated, by using heat generated through combustion of a fuel, comprising:
   a fuel supply device that supplies the fuel to the device;
   a vaporizing device that burns a portion of the fuel supplied by the fuel supply device, and vaporizes a remaining portion of the fuel by using heat generated through combustion of the portion of the fuel;
   a first air supply device that supplies air to be used for combustion of the portion of the fuel by the vaporizing device; and
   a second air supply device that supplies air to be used for combustion of the remaining portion of the fuel vaporized by the vaporizing device,
   wherein the first air supply device supplies air upstream of the vaporizing device, and the second air supply device supplies air downstream of the vaporizing device.

2. A combustion heating device according to claim 1, wherein the fuel supply device sprays the fuel into the device.

3. A combustion heating device according to claim 1, further comprising:
   a first air amount control unit that controls an amount of air supplied by the first air supply device, based on an amount of the fuel supplied by the fuel supply device.

4. A combustion heating device according to claim 3, wherein the first air amount control unit controls the first air supply device so as to supply an amount of air that is needed for vaporizing the fuel supplied to the device.

5. A combustion heating device according to claim 3, further comprising:
   a second air amount control unit that controls an amount of air supplied by the second air supply device, based on an amount of the fuel supplied by the fuel supply device.

6. A combustion heating device according to claim 1, further comprising:
   a second air amount control unit that controls an amount of air supplied by the second air supply device, based on an amount of the fuel supplied by the fuel supply device.

7. A combustion heating device according to claim 1, wherein the vaporizing device carries a catalyst capable of burning the fuel.

8. A combustion heating device according to claim 7, wherein the vaporizing device includes a heating device operable to heat the catalyst.

9. A combustion heating device according to claim 1, further comprising:
   a heat exchanger that carries a catalyst capable of burning the fuel, and is operable to heat the fluid to be heated, by using heat that is generated when a fuel contained in a mixed gas of the fuel vaporized by the vaporizing device and the air supplied by the second air supply device is burned on the catalyst.

10. A fuel reforming apparatus for reforming a hydrocarbon-based fuel into a hydrogen-rich fuel gas, comprising:
   (a) a combustion heating device adapted to heat and vaporize at least one of the hydrocarbon-based fuel and water as a fluid to be heated, by using heat generated through combustion of a fuel, comprising:
      a fuel supply device that supplies the fuel to the device;
      a vaporizing device that burns a portion of the fuel supplied by the fuel supply device, and vaporizes a remaining portion of the fuel by using heat generated through combustion of the portion of the fuel;
      a first air supply device that supplies air to be used for combustion of the portion of the fuel by the vaporizing device; and
      a second air supply device that supplies air to be used for combustion of the remaining portion of the fuel vaporized by the vaporizing device,
      wherein the first air supply device supplies air upstream of the vaporizing device, and the second air supply device supplies air downstream of the vaporizing device; and
   (b) a reforming device that is supplied with the at least one of the hydrocarbon-based fuel and water that has been vaporized by the combustion heating device, and reforms the hydrocarbon-based fuel into the fuel gas through a steam reforming reaction.

11. A fuel reforming apparatus according to claim 10, wherein:
   the combustion heating device further comprises a heat exchanger that carries a catalyst capable of burning the fuel, and is operable to heat the fluid to be heated, by using heat that is generated when a fuel contained in a mixed gas of the fuel vaporized by the vaporizing device and the air supplied by the second air supply device is burned on the catalyst; and
   the at least one of the hydrocarbon-based fuel and water is allowed to pass through the heat exchanger so as to be vaporized.

12. A fuel cell system, comprising:
   a fuel reforming apparatus adapted to reform a hydrocarbon-based fuel into a hydrogen-rich fuel gas; and
   a fuel cell that is supplied with the hydrogen-rich fuel gas from the fuel reforming apparatus and the air, so as to generate electric power,
   wherein the fuel reforming apparatus comprises:
      (a) a combustion heating device adapted to heat and vaporize at least one of the hydrocarbon-based fuel and water as a fluid to be heated, by using heat generated through combustion of a fuel, comprising:
         a fuel supply device that supplies the fuel to the device;
         a vaporizing device that burns a portion of the fuel supplied by the fuel supply device, and vaporizes a remaining portion of the fuel by using heat generated through combustion of the portion of the fuel;
         a first air supply device that supplies air to be used for combustion of the portion of the fuel by the vaporizing device; and
         a second air supply device that supplies air to be used for combustion of the remaining portion of the fuel vaporized by the vaporizing device, wherein the first air supply device supplies air upstream of the vaporizing device, and the second air supply device supplies air downstream of the vaporizing device; and
      (b) a reforming device that is supplied with the at least one of the hydrocarbon-based fuel and water that has been vaporized by the combustion heating device, and reforms the hydrocarbon-based fuel into the fuel gas through a steam reforming reaction; and
      wherein at least one of the first air supply device and the second air supply device supplies air to the fuel cell.

13. A fuel cell system according to claim 12, further comprising:

a first cathode exhaust gas supply device that supplies cathode exhaust gas of the fuel cell in addition to or in place of the air supplied by the first air supply device, so that the cathode exhaust gas is used for combustion of the portion of the fuel by the vaporizing device.

14. A fuel cell system according to claim 13, further comprising:

a second cathode exhaust gas supply device that supplies a cathode exhaust gas of the fuel cell in addition to or in place of the air supplied by the second air supply device, so that the cathode exhaust gas is used for combustion of the remaining portion of the fuel vaporized by the vaporizing device.

15. A fuel cell system according to claim 12, further comprising:

a cathode exhaust gas supply device that supplies a cathode exhaust gas of the fuel cell in addition to or in place of the air supplied by the second air supply device, so that the cathode exhaust gas is used for combustion of the remaining portion of the fuel vaporized by the vaporizing device.

16. A fuel cell system according to claim 12, further comprising:

an anode exhaust gas supply device that supplies an anode exhaust gas of the fuel cell in addition to the air supplied by the second air supply device, so that the anode exhaust gas is used for combustion of the remaining portion of the fuel vaporized by the vaporizing device.

17. A fuel cell system according to claim 13, further comprising:

an anode exhaust gas supply device that supplies an anode exhaust gas of the fuel cell in addition to the air supplied by the second air supply device, so that the anode exhaust gas is used for combustion of the remaining portion of the fuel vaporized by the vaporizing device.

18. A fuel cell system according to claim 14, further comprising:

an anode exhaust gas supply device that supplies an anode exhaust gas of the fuel cell in addition to the air supplied by the second air supply device, so that the anode exhaust gas is used for combustion of the remaining portion of the fuel vaporized by the vaporizing device.

19. A fuel cell system according to claim 15, comprising:

an anode exhaust gas supply device that supplies an anode exhaust gas of the fuel cell in addition to the air supplied by the second air supply device, so that the anode exhaust gas is used for combustion of the remaining portion of the fuel vaporized by the vaporizing device.

* * * * *